UNITED STATES PATENT OFFICE.

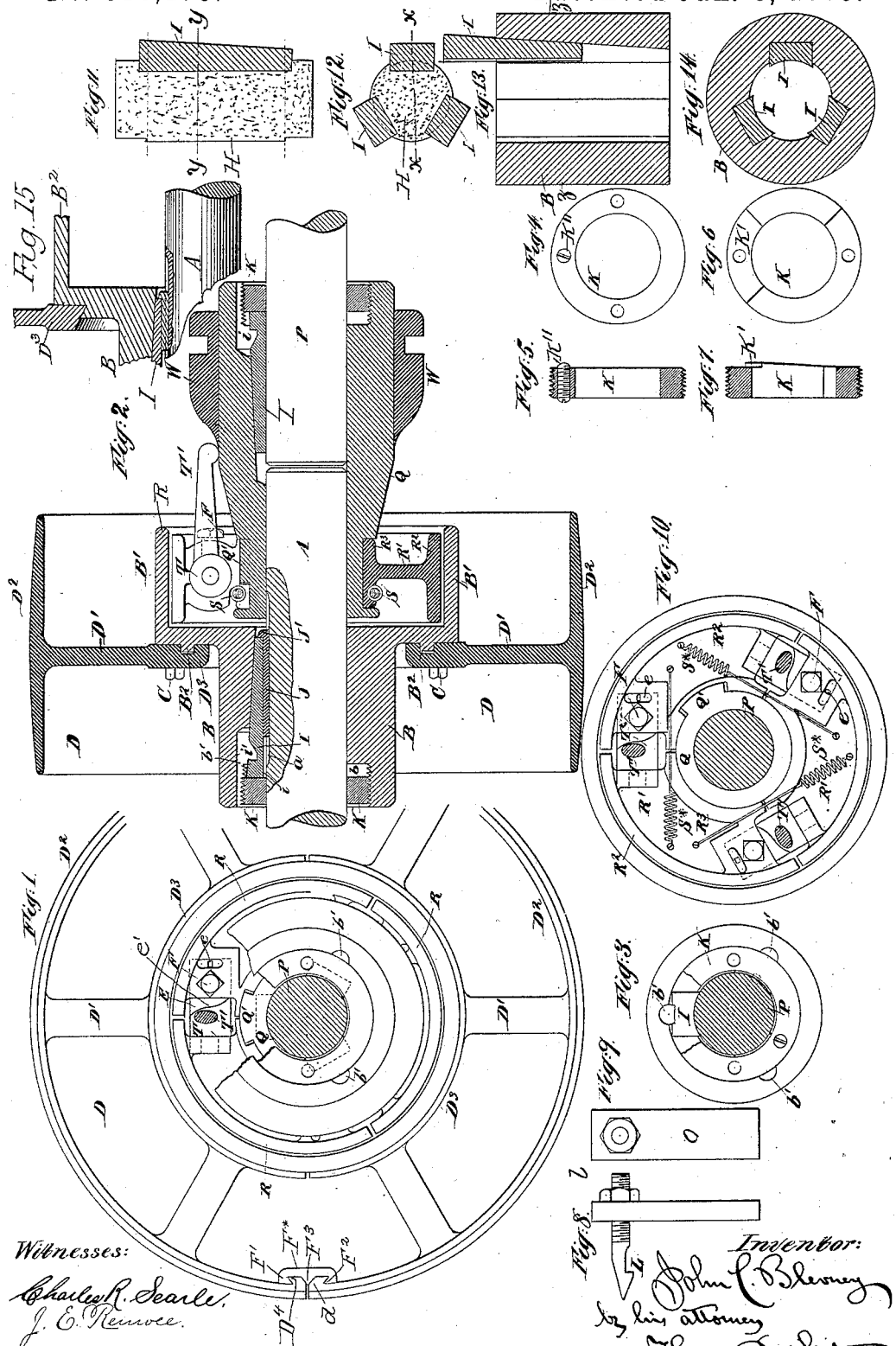

JOHN C. BLEVNEY, OF NEWARK, NEW JERSEY.

FRICTION-COUPLING.

SPECIFICATION forming part of Letters Patent No. 310,173, dated January 6, 1885.

Application filed May 21, 1884. (No model.)

*To all whom it may concern:*

Be it known that I, JOHN C. BLEVNEY, of Newark, Essex county, New Jersey, have invented certain new and useful Improvements in Friction-Couplings, of which the following is a specification.

The invention consists of improvements in the details of the mechanism, as fully set forth below.

My friction coupling or clutch is of that class in which levers project from one part and are actuated by a cone or other device moving on the other part to engage and disengage the clutch. Imperfections in the workmanship or wear of the parts often make the action of the levers unequal, so that the ordinary friction-clutches which depend upon absolute mathematical exactness of the position of the parts relatively to each other are defective in their action.

I have devised a construction in which the levers may be acted on with any required amount of inequality, even to the extent of one remaining idle and another or others doing all the work, without involving any mischief. The strain on all the levers will be equal and the friction on all the friction-surfaces will be equal, whether the levers are actuated evenly or unevenly. I employ efficient means for fixing the hub of the wheel or a corresponding portion of a coupling centrally on the shaft, and also for liberating the hub or coupling from its rigid and central engagement on the shaft. I make the exterior or effective pulley in two parts, very efficiently joined together. I employ special means for mounting a pulley on a hub detachably and exactly centrally, so that a great number of sizes of pulleys can be worked successively on the same hub, to give different speeds to the machinery, and different hubs may be used with the same pulley to adapt it for different-sized shafts.

The following is a description of what I consider the best means of carrying out the invention.

The accompanying drawings form a part of this specification.

Figure 1 is an end elevation, certain portions being broken away to show the interior. Fig. 2 is a corresponding central longitudinal section. Fig. 3 is an end elevation of the parts immediately adjacent to the shaft, showing the provisions for fixing the parts rigidly and centrally together. Figs. 4 and 5 show the provisions for driving and holding the wedges on a larger scale. Fig. 4 is an end view, and Fig. 5 is a side view. Figs. 6 and 7 show a modification. Fig. 6 is an end view, and Fig. 7 a central cross-section. Figs. 8 and 9 show the provisions for removing the wedges when such shall become necessary. Fig. 8 is a side view, and Fig. 9 an end view. Fig. 10 is a side elevation showing a modification of the principal parts. Figs. 11 to 14 show the means for producing the proper recesses in the hub to receive the wedges. I will, for simplicity, omit the provisions for making the cavities for operating the keys. Fig. 11 is a central longitudinal section through the core on the line $xx$ in Fig. 12. Fig. 12 is a horizontal section on the line $yy$ in Fig. 11. Fig. 13 is a longitudinal section through the completed hub after the wedges have been displaced and one has been partly reinserted. Fig. 14 is a corresponding section on the line $zz$ in Fig. 13. Fig. 15 is a sectional view of a modification.

Similar letters of reference indicate corresponding parts in all the figures where they occur.

A and P are two lengths of shafting of equal size mounted in line.

A is the driving-shaft.

The object of the clutch is to connect A with P at will, and to disconnect it therefrom, and to make the changes with the gentleness peculiar to friction-clutches while allowing the workmanship to be imperfect and the action of the levers unequal.

B is a sufficiently-stout hub. Certain portions will be designated when necessary by reference-letters B' B². It is firmly and concentrically set on the shaft A by means which will be described farther on.

B' is a cylindrical box on one end of the hub B and open on the face presented toward the other shaft, P. The inner surface of this cylinder is finished very smoothly.

Q is a stout collar, a portion of which will be designated, when necessary, by reference-letter Q'. It is firmly and concentrically fixed on the shaft P. The friction is made or relaxed at will on the interior of the cylinder B' by three segments or shoes, R R R, carried by the collar Q. A stout projection or dog, Q', on the collar Q engages in a recess in the parts R; but the engagement is so loose that there is liberty for some movement. The segments R may be expanded outward, so as to tightly fill the cylinder B' and induce a strong friction against the interior surface thereof, by any sufficient means applied in the joints where they abut against each other. The result will equally follow whether the distention of these segments by their separation at the joints is uniform or unequal. If the separation is all at one point it will crowd the segments together at the other joints, but with no mischievous effect. The bearing by the exteriors of the segments against the interior of the cylinder will be equally uniform and effective. On relaxing the distending force the segments may be brought inward again toward the collar by any gentle force.

T T T are spiral wedges, partial screws, partially-revolving wedges, or spiral-ended bosses mounted in the spaces thus provided. Each is plane on one end and abuts against a corresponding plane face on the adjacent segment. Each is helical or screw formed on the opposite face, as shown at $e'$, and abuts against a corresponding surface on the opposite segment R. Each is provided with a lever, T', which extends in the direction of the shaft P, and is adapted to be actuated by a movable wedge-sleeve, W, which is arranged to traverse on the fixed collar Q, being actuated by any suitable shipper. (Not represented.) Each segment R is formed with a web, R', a broad unobstructed bearing-surface, $R^2$, on its periphery and approximately corresponding bearing-surface, $R^3$, on its inner face, and a considerable enlargement or thickening of the web at each end which accommodates the center pin of the corresponding levers T'. The enlargement at one end of each segment R is sufficient to also receive an adjustable piece, E, which I will term a "cam," having a spiral wedge or helical surface, $e'$.

F F F are pinching-screws which hold E firmly. There is a notch or score, $e$, into which any suitable tool may be introduced through a slot in the segment, and by which, when the pinching-screw G is relaxed, the cam E may be turned partially around and again secured in a new position. This adjustable cam enables me to set the segments to work more easily or loosely in the cylinder B', as required, from time to time, to compensate for wear or for any other reason. A channel is provided in the series of segments extending quite around. A long spiral spring, S, extends around in this channel and is united at its ends so as to form a continuous ring. It exerts a sufficient contractile force to draw the segments R inward so soon as the distending force due to the action of the levers T' and their wedge-faces $e'$ is relaxed.

Fig. 10 shows a modification of this portion of the mechanism. Instead of a continuous spiral spring extending quite around, I employ three separate spiral springs, one for each of the joints or spaces between the several segments, R. One of these is indicated by $S^*$. It is attached directly to one segment and exerts a tensile force on a rod which connects to the other segment. This construction may be preferable under some conditions where the action of the several levers T' keeps the distention at the several joints tolerably uniform. When, with this modification, the springs shall differ in stiffness and thus exert different forces, they can be made approximately equal by adjusting the cam E to work the segments nearer together where the spring is stiffest. This construction is preferable for the largest sizes of friction-clutches. For small and medium sizes I prefer one continuous spiral spring, as first described.

$B^2$ is a stout finished lip of rectangular section, formed on the cylinder B' in the position represented.

D is a wheel adapted to form the exterior or working portion of the pulley, certain portions being designated, when necessary, by reference-letters D' $D^2$. The peripheral surface or outer rim, $D^2$, is adapted to receive a belt. (Not represented.)

D' are spokes or arms extending inward from the peripheral rim $D^2$ to an inner rim, $D^3$. The lip $B^2$ engages in a correspondingly-finished groove in the inner rim, $D^3$, which by bolts C or other efficient means is firmly secured to the cylinder B' and turns therewith.

When it is desired to change the size of the pulley, the exterior portion, D, is removed and another substituted of larger or smaller size, and bolted in place, the inner part or hub, B B' $B^2$, not being changed or disturbed. The finished lip $B^2$, engaging in the correspondingly-finished groove in $D^3$, holds the parts concentric with but little labor in finishing, and without depending for the concentricity on the holding-bolts. I have shown the wheel D as made in two parts and secured together by the means to be set forth below.

K is a ring screw-threaded on its exterior, and engaged with corresponding screw-threads, $b$, in an annular cavity formed in the end of the hub B.

I I I are three equally-spaced wedges, each hollowed on its inner face to a radius a little less than that of the shaft A. Each is fitted in a corresponding wedge-shaped space provided in the hub B. Each has a notch, $i'$, on its outer face. There is a recess, $b'$, in the hub corresponding to each wedge I, which allows the insertion of a hook, L, to be properly operated by a screw device working in the screw-threads $b$, by which I effect the removal of the wedges I when necessary. The removal is effected by placing the bar O across the recess $b'$, engaging the hook L in the notch $i'$, and turning the nut $l$ to draw forcibly on L. The hub B is held by the wedges I absolutely concentric to the shaft A, provided the wedges are driven to a uniform extent. The screw-ring K insures that the wedges shall be uniformly held.

Figs. 6 and 7 show a temporary screw-ring,

K, with a wedge-shaped projection, K', on the side. This screw-ring is applied with the projection K' toward the heads of the wedges, and as it is strongly turned by a suitable wrench the projection K' acts on the several wedges in succession, concentrating all the force at any given period on one wedge. After the wedges I are thus forced to a firm bearing this temporary screw-ring K K' is withdrawn, and a permanent ring having no such projection K' is applied. This, on being forced down into contact, presses inward only the one or two which are first touched, and finally remains fairly against the whole and keeping them firmly in place.

Figs. 4 and 5 show a corresponding construction, but with the projection K'' in the form of a rounded end on a small screw, which is tapped through the substance of the ring K, as shown. This affords the advantage that when the wedges are nearly home they resist motion to such extent that the projections K' K'' cannot be forced past a certain wedge, the secondary screw K'' may be turned backward a little, and then the main screw-ring K turned again until it is caused to pass. The effect is to force the wedge in to a less extent. Thus by acting on each successively the last slight motion may be imparted to all the wedges.

One advantage due to the fact that my screw-threaded ring K has its screw-threads on the exterior and engages in a correspondingly-threaded recess, $b$, in the hub, is that the hub may be threaded by a tap. The ring K is easily threaded on its exterior in any common lathe. These wedges may also be driven either by the direct pressure of the screw-ring K, or by blows with a sufficiently-heavy hammer, which may be impressed on the several wedges I, through the medium of a set or short bar of iron applied successively on the ends of the several wedges. These blows may be mainly given before the ring K is applied. After K is introduced and screwed home, further blows may be given with some effect and the ring farther driven to follow up until all the wedges are evenly and very tightly set.

The applying and removing of the wheel or pulley D is facilitated by making it in halves. It is cast in one piece and cut or broken apart after the finished exterior is turned, or otherwise properly smoothed and trued, and the groove is finished in which to receive the lip $B^2$. The halves are subsequently secured together with unusual strength and rigidity by clamps F*, certain portions being designated, when necessary, by reference-letters, as F' F². These clamps are first produced by casting, or otherwise, in the form required, with engaging-flanges F' F² along the edges, and the V-sectioned ridges F³ along the center. The flanges are a little nearer together at one edge than at the other. When the pulley is cast, these clamps are placed in position in the mold, or in suitable cores inserted in the mold, so as to properly hold the clamps. Then the melted metal of the pulley or wheel D, flowing against or around the clamps, makes a perfect fit. After the pulley is removed from the sand and is cold, the clamps F* are detached by driving them laterally, the pulley is finished and cut or broken apart, and the clamps F* replaced. A locking-key or other means may be provided for insuring the retention of each clamp F*; but my experiments indicate that such will not be necessary. I have shown but one clamp F*. It will be understood that there is another on the inner face of the rim at the opposite side. There will also in large pulleys be one such clamp similarly locking with the metal of the wheel on the outer face of the inner rim, $D^3$, at the points where such rim is broken or cut. My clamps not only hold the wheel firmly together by their flanges F' F², but also, by their V-shaped central ridges, F³, hold the joint very stiffly against any working of the parts under any strain. In the wheel D, I have marked the beveled recesses $d$, and the clamping projections $D^4$.

It will be observed that the ridge F³ of the clamp F* not only serves to strengthen the clamp, but also to render the finished pulley easily broken at that point. I have shown this ridge of V-shaped form; but this form may be modified, as any plate with tapering projections which will allow metal to be cast around it, as described, will meet the requirements of the invention.

It will be observed by the construction illustrated that I use the screws C C to fasten the pulley D to the cylinder B' or hub B; but it is obvious that I may finish the rib B² with inclined sides, the diameter diminishing toward the base, and form the hub D³ of the pulley to match, with the bore slightly smaller than the rib, all as seen in Fig. 15. In such case the clamps, as F*, will hold the pulley centrally and firmly without said screws C. In large pulleys I would insert a feather or pin between the adjoining surfaces of B² and D³. It is understood that in such case there is no necessity of the hub D³ overlapping the rib.

In the manufacture I first produce the wedges I and then fit them deeply sunk in the core H, which is to shape the interior of the hub B. Thus the hub is cast with these wedges in their correct position circumferentially, but projecting too far inward. When the metal is cold, the wedges will be held in their positions in the hub with sufficient firmness to allow the hub to be strongly held, and a boring-tool applied to finish the entire inner surface of each wedge, reducing it exactly to the form required, with a slightly greater curvature than matches the shaft. After this is done the wedges, after being properly marked, may be detached from their seats by sufficient force, and either with or without slightly filing or otherwise reducing the surfaces they may be returned to their places, ready to be driven tightly home. For increased security I mill or otherwise produce a recess, $a$, in the shaft A, and a corresponding recess, $i$, in one of the wedges, I, and apply a feather, J, loosely therein, having a head, J', which prevents its escape endwise. This insures against any considerable displacement of the hub B; but I believe the feather will only rarely be of service. My experiments show no slipping of the wedges around on the shaft. I have shown the collar Q as similarly held on the shaft P, but this is not material. The collar may be held by any efficient means. It is mainly important that the cylinder B' and the pulley-surface $D^2$ be concentric to each other and to the shaft A. Whenever the wear of the rubbing surfaces shall make it possible to throw the levers T' out to their full proper extent without inducing sufficient pressure in the cylinder B', one of the pinching-screws F must be slackened, and the cam E turned in the direction to contract the space for the boss T. Then the screw G must be tightened again. The ends of the segments may be tongued and grooved, so that they can be drawn together or spread apart within certain limits without opening a joint through which dust may pass.

Modifications may be made in the forms and proportions within wide limits without departing from the principle or sacrificing the advantages of the invention. Instead of three segments or shoes, R, and a corresponding number of levers, T', I can use two with success, or four, or even a greater number. I can use parts of the invention without the whole. I can dispense with the adjustable cams E and form the helical or spiral wedge-surfaces $e'$ in the required positions directly on the proper segments, R. Each side, instead of one side of each boss T, may be formed with a helical surface and made to work against a corresponding helical surface on the adjacent segment R. Each lever T' may have a roller to diminish friction on the wedge-sleeve W. Instead of making the web R' of each segment R in the plane of the centers of the bosses T, it may be in front or nearer the shaft P. It is important to make as close a fit as is practicable of each segment to the boss T, in order to exclude dust. The web of the segment (by which I mean the metal R' which connects the outer rim, $R^2$, with the inner rim, $R^3$, as shown) is made to fit closely but easily to the surface of the boss T. It may be continuous, with the exception of a sufficient space to allow the levers T' their greatest vibration. I have shown the invention applied to coupling two shafts, A and P. The invention may be equally well used to connect and disconnect a pulley and shaft. In such case what I have shown as the two shafts A and P will be one continuous shaft. The only alteration necessary is that the hub B must be loose on the shaft, and some provision, as a collar, (not represented,) fixed on the shaft opposite to the collar Q, to hold the hub B in its proper position endwise. Then when the wedge-sleeve W is moved away and the lever T' and segments R move inward, the pulley turns on the shaft without communicating motion thereto or receiving motion therefrom, as the case may be. When, on the contrary, the wedge-sleeve W is shifted to throw out the levers T' and the segments R, the friction takes hold on the interior of the cylinder B' and communicates the motion strongly.

The several methods incident to the manufacture of the pulleys, as herein described, will be made subject-matter for separate application.

Having now particularly described and ascertained the nature of my said invention, and in what manner the same is to be performed, I declare that what I claim is—

1. A split pulley having clamping-surfaces $D^4$ and beveled recesses $d$, in combination with clamps having flanges F' $F^2$, and engaging-ridges $F^3$, arranged to serve substantially as herein specified.

2. The headed feather J J', wedges I, having recess $i$, and screw-ring, K, in combination with each other and with the hub B and shaft A, as herein specified.

3. The shaft A, hub B, and wedges I, in combination with each other and with the screw-ring K, having a projection, K', arranged to serve as herein specified.

4. The wedges I, having each a recess, $i$, on its exterior face, in combination with the hub B, having recesses to receive the wedges, and also longitudinal recesses $b$, as shown, and with the shaft A, bar O, hook-bolts L, and nut $l$, adapted to serve in withdrawing the wedges, as herein specified.

5. The hub B, cylinder B', fixed thereon, and expansible segments R, in combination with each other and with the wedges I, all operated as described, and arranged to serve as herein specified.

6. The hub B, secured to shaft A, and finished lip $B^2$, in combination with the shaft A, exchangeable pulley D, matching said lip $B^2$, and with suitable fastenings, C, arranged for joint operation, as herein specified.

7. The hub B and cylinder B', having a finished lip, $B^2$, in combination with the friction-segments R, operated as described, and with the exchangeable wheel or pulley D, having a corresponding finished groove to receive said lip, and with fastenings C, all arranged for joint operation, substantially as herein specified.

8. The shaft A, wedges I, feather J J', hub B, having cylinder B' and lip $B^2$, friction-segments R, and operating means T T' W, exchangeable pulley D, and fastening means C, combined and arranged to serve as and for the purposes herein specified.

In testimony whereof I have hereunto set my hand, at Washington, District of Columbia, this 21st day of May, 1884, in the presence of two subscribing witnesses.

JOHN C. BLEVNEY.

Witnesses:
H. CLAY SMITH,
JAS. L. SUMAN.